(12) United States Patent
Takei

(10) Patent No.: US 11,370,414 B2
(45) Date of Patent: Jun. 28, 2022

(54) VEHICLE ATTITUDE CONTROL APPARATUS

(71) Applicant: TOYOTA JIDOSHA KABUSHIKI KAISHA, Toyota (JP)

(72) Inventor: Masayuki Takei, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 622 days.

(21) Appl. No.: 16/356,215

(22) Filed: Mar. 18, 2019

(65) Prior Publication Data

US 2019/0283733 A1 Sep. 19, 2019

(30) Foreign Application Priority Data

Mar. 19, 2018 (JP) .............................. JP2018-050970

(51) Int. Cl.
| | | |
|---|---|---|
| *B60W 30/00* | (2006.01) | |
| *B60W 30/02* | (2012.01) | |
| *B60G 17/016* | (2006.01) | |
| *B60T 8/24* | (2006.01) | |
| *B60W 10/18* | (2012.01) | |
| *B60W 10/22* | (2006.01) | |
| *B60T 8/32* | (2006.01) | |

(52) U.S. Cl.
CPC ......... *B60W 30/02* (2013.01); *B60G 17/0164* (2013.01); *B60T 8/245* (2013.01); *B60W 10/18* (2013.01); *B60W 10/22* (2013.01); *B60G 2800/014* (2013.01); *B60T 8/3285* (2013.01); *B60W 2710/18* (2013.01); *B60W 2710/22* (2013.01); *B60W 2720/16* (2013.01)

(58) Field of Classification Search
CPC .......... B60G 2600/182; B60G 2202/30; B60G 2202/413; B60G 2202/42
See application file for complete search history.

(56) References Cited

U.S. PATENT DOCUMENTS

| | | | | |
|---|---|---|---|---|
| 8,387,762 B2 * | 3/2013 | Kondo | ................... | B60G 17/06 |
| | | | | 188/266.3 |
| 9,586,456 B2 * | 3/2017 | Reybrouck | ........ | B60G 17/0272 |
| 2014/0288776 A1 * | 9/2014 | Anderson | .......... | B60G 17/0157 |
| | | | | 701/37 |
| 2016/0347144 A1 * | 12/2016 | Suissa | .................... | B60G 17/00 |
| 2017/0349022 A1 | 12/2017 | Masamura | | |

FOREIGN PATENT DOCUMENTS

| | | |
|---|---|---|
| CN | 2471588 Y | 1/2002 |
| JP | 2016-88359 | 5/2016 |

* cited by examiner

*Primary Examiner* — Truc M Do
(74) *Attorney, Agent, or Firm* — Oblon, McClelland, Maier & Neustadt, L.L.P.

(57) ABSTRACT

A vehicle attitude control apparatus is provided in which an active suspension device of each wheel has a mass body arranged between a sprung mass and an unsprung mass of a vehicle, and upper and lower actuators each configured to generate an actively generated force acting on the sprung and unsprung masses, respectively, by applying urging forces to the masses, and a control unit calculates a target braking/driving force of each braking/driving device for achieving target motion state quantities of the vehicle, target actively generated forces of the upper and lower actuators, and controls a braking/driving device and the upper and lower actuators, so that the target braking/driving force and the target actively generated forces of the upper and lower actuators are achieved.

4 Claims, 9 Drawing Sheets

| No. | Type of Drive | | | Active Suspension |
|---|---|---|---|---|
| | Drives | Configuration | Image | |
| 1 | 2 | Front: In-wheel Motors | 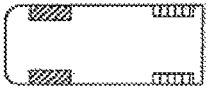 | Front+Rear |
| 2 | | Rear: In-wheel Motors |  | Front+Rear |
| 3 | | Front: 2 Shafts Drive | 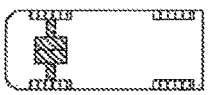 | Front+Rear |
| 4 | | Rear: 2 Shafts Drive |  | Front+Rear |
| 5 | 3 | Front: In-wheel Motors<br>Rear: 1 Shaft Drive | 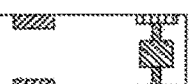 | Front+Rear |
| 6 | | Front: 1 Shaft Drive<br>Rear: In-wheel Motors | 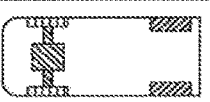 | Front+Rear |
| 7 | | Front: 2 Shafts Drive<br>Rear: 1 Shaft Drive | 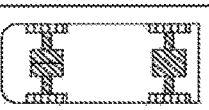 | Front+Rear |
| 8 | | Front: 1 Shaft Drive<br>Rear: 2 Shafts Drive | 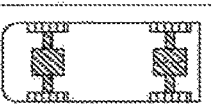 | Front+Rear |
| 9 | 4 | 4 Wheels: In-wheel Motors | 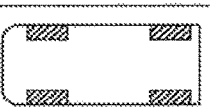 | Front Only<br>Rear Only<br>Front+Rear |
| 10 | | Front: In-wheel Motors<br>Rear: 2 Shafts Drive | 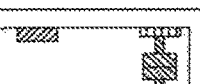 | Front Only<br>Rear Only<br>Front+Rear |
| 11 | | Front: 2 Shafts Drive<br>Rear: In-wheel Motors | 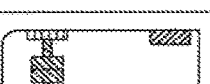 | Front Only<br>Rear Only<br>Front+Rear |

FIG.9

VEHICLE ATTITUDE CONTROL APPARATUS

CROSS-REFERENCE TO RELATED APPLICATION

The disclosure of Japanese Patent Application No. JP2018-50970 filed on Mar. 19, 2018 is incorporated by reference in its entirety.

BACKGROUND

1. Technical Field

The present disclosure relates to an attitude control apparatus for a vehicle such as an automobile.

2. Description of the Related Art

In vehicles such as automobiles, in addition to a suspension spring and a shock absorber (damper), active suspension devices may be provided between sprung and unsprung masses. The active suspension devices change forces acting between the sprung and the unsprung masses by actuators. Therefore, according to the active suspension devices, a motion of the sprung mass can be controlled by changing the forces acting between the sprung and the unsprung masses, so that the sprung mass can be damped and an attitude change of the sprung mass can be reduced.

For example, Japanese Patent Application Laid-open Publication No. 2016-88359 describes an active suspension device having a piston-cylinder type hydraulic actuator provided with an upper chamber and a lower chamber. The actuator is configured to change an axial force by controlling supply and discharge of liquid to and from the upper chamber and the lower chamber. In addition, as an actuator that changes an axial force, there is also known an electromagnetic actuator configured to change an axial force by an electromagnetically generated driving torque being converted into an axial force.

An axial force generated by the above-described axial force change type actuator is transmitted to the sprung and unsprung masses as forces of the same magnitude and opposite in direction. Therefore, when attempting to increase or decrease a force acting on the sprung mass, a force in the opposite direction which acts on the unsprung mass increases or decreases. Similarly, when it is attempted to increase or decrease a force acting on the unsprung mass, an opposite force acting on the sprung mass also increases or decreases. In addition, it is impossible to exert a force only on one of the sprung and unsprung masses, it is also impossible to exert forces in the same direction on the sprung and unsprung masses, and furthermore, it is impossible to differentiate magnitudes of forces acting on the sprung and unsprung masses in opposite directions.

Therefore, in a vehicle equipped with conventional active suspension devices each having a variable axial force type actuator, it is impossible to exert forces on the sprung mass and the unsprung mass independently of each other. Consequently, it is not possible to preferably control the sprung motion by individually controlling the forces acting on the sprung and unsprung masses, which makes it impossible to effectively achieve damping of the sprung mass and reduce an attitude change of the sprung mass.

SUMMARY

The present disclosure provides a vehicle attitude control apparatus which is improved so that forces can be exerted independently on the sprung and unsprung masses so as to effectively achieve damping and reduction of an attitude change of the sprung mass.

According to the present disclosure, a vehicle attitude control apparatus is provided which comprises braking/driving devices for imparting braking/driving forces to respective wheels, active suspension devices each incorporated in a suspension of the corresponding wheel to change a vertical force acting between a sprung mass and an unsprung mass of a vehicle, and a control unit for controlling the braking/driving device and the active suspension device.

As is, well known, when braking/driving forces are applied to the wheels by the braking/driving devices, a braking/driving force is applied to the vehicle, and a vertical force corresponding to the braking/driving force acts between the sprung mass and the unsprung mass at the position of each wheel. Each active suspension device changes the vertical force acting between the sprung mass and the unsprung mass at the position of the corresponding wheel. Therefore, by controlling the braking/driving devices and the active suspension devices by a control unit, it is possible to control the braking/driving forces of the wheels and to control vibration and attitude of the sprung mass.

In the vehicle attitude control apparatus according to the present disclosure, each active suspension device includes a mass body disposed between the sprung mass and the unsprung mass of the vehicle, an upper actuator configured to apply an urging force to the mass body and transmit an upper actively generated force, which is a reaction force thereof, to the sprung mass, and a lower actuator configured to apply an urging force to the mass body and transmit a lower actively generated force, which is a reaction force thereof, to the unsprung mass.

According to the above configuration, each upper actuator can apply an upper actively generated force which is a reaction force of its own urging force to the sprung mass and each lower actuator can apply a lower actively generated force which is a reaction force of its own urging force to the unsprung mass. Therefore, by individually controlling the urging forces of the upper and lower actuators, it is possible to individually control a force acting on the sprung mass and a force acting on the unsprung mass at the position of each wheel.

Therefore, it is possible to appropriately control forces acting on the sprung and unsprung masses at the position of each wheel, as compared to where the actuator is of variable axial force type. Consequently, as compared with the conventional attitude control apparatus, it is possible to more appropriately control vibration and attitude of the sprung mass and to more effectively achieve the damping control and the attitude control of the sprung mass.

Further, in the vehicle attitude control apparatus according to the present disclosure, the control unit is configured to calculate target motion state quantities for stabilizing attitude of the vehicle based on a running state of the vehicle, calculate target braking/driving forces of the braking/driving devices, target upper actively generated forces, and target lower actively generated forces for setting motion state quantities of the vehicle to the target motion state quantities, and control the braking/driving devices, the upper actuators and the lower actuators so that the target braking/driving forces, the target upper actively generated forces, and the target lower actively generated forces are achieved.

According to the above configuration, the braking/driving devices, the upper actuators and the lower actuators can be controlled so that braking/driving forces of the braking/driving device, upper actively generated forces and lower actively generated forces become the target braking/driving forces, the target upper actively generated forces and the target lower actively generated forces, respectively. Consequently, motion state quantities of the vehicle can be controlled to be the target motion state quantities, so that the damping control and the attitude control of the sprung mass can be performed according to the target motion state quantities.

In one aspect of the present disclosure, a total number of the braking/driving devices, the upper actuators and the lower actuators is larger than a number of the target motion state quantities, and the control unit is configured to calculate the target braking/driving forces, the target upper actively generated forces, and the target lower actively generated forces so that a square norm of the target braking/driving forces, the target upper actively generated forces and the target lower actively generated forces becomes minimum and motion state quantities of the vehicle becomes the target motion state quantities.

According to the above aspect, the target braking/driving forces, the target upper actively generated forces and the target lower actively generated forces are set such that a square norm of the target braking/driving forces, the target upper actively generated forces and the target lower actively generated forces becomes minimum, and motion state quantities are calculated to be the target motion state quantities. Therefore, energy required for damping of the sprung mass and controlling attitude of the sprung mass is minimized, so that energy consumed by the damping control and the attitude control of the sprung mass can be reduced.

In another aspect of the present disclosure, each upper actuator cooperates with the mass body to constitute an upper linear motor, and each lower actuator cooperates with the mass body to constitute a lower linear motor.

According to the above aspect each upper actuator cooperates with the mass body to function as an upper linear motor, and each lower actuator cooperates with the mass body to function as a lower linear motor. Therefore, each upper actuator and each lower actuator can generate the upper actively generated force and the lower actively generated force, respectively, without contacting the mass body.

Further, in another aspect of the present disclosure, each upper actuator includes an upper rack bar and an upper pinion; one of the upper rack bar and the upper pinion is supported by the sprung mass and the other of the upper rack bar and the upper pinion is supported by the mass body; each lower actuator includes a lower rack bar and a lower pinion; and one of the lower rack bar and the lower pinion is supported by the unsprung mass and the other of the lower rack bar and the lower pinion is supported by the mass body.

According to the above aspect, each upper actuator can, generate upper actively generated force by applying driving torque to the upper pinion. Likewise, each lower actuator can generate lower actively generated force by applying driving torque to the lower pinion.

Further, in another aspect of the present disclosure, each mass body is supported by at least one of the sprung mass and the unsprung mass via a spring system and a damping system.

According to the above aspect, when each active suspension device is not operated, the mass body can be supported by at least one of the sprung mass and the unsprung mass via the spring system and the damping system. Therefore, the mass body can be held in a predetermined relationship with the upper actuator, the lower actuator, the sprung mass and the unsprung mass.

Other objects, other features and attendant advantages of the present disclosure will be readily understood from the description of the embodiments of the present disclosure described with reference to the following drawings.

BRIEF DESCRIPTION OF THE DRAWINGS

FIG. 9 is a diagram showing various examples in which the number and arrangement of control devices are different from those in the first embodiment.

DETAILED DESCRIPTION

The present disclosure will now be described in detail with reference to the accompanying drawings.

First Embodiment

Figure 1:
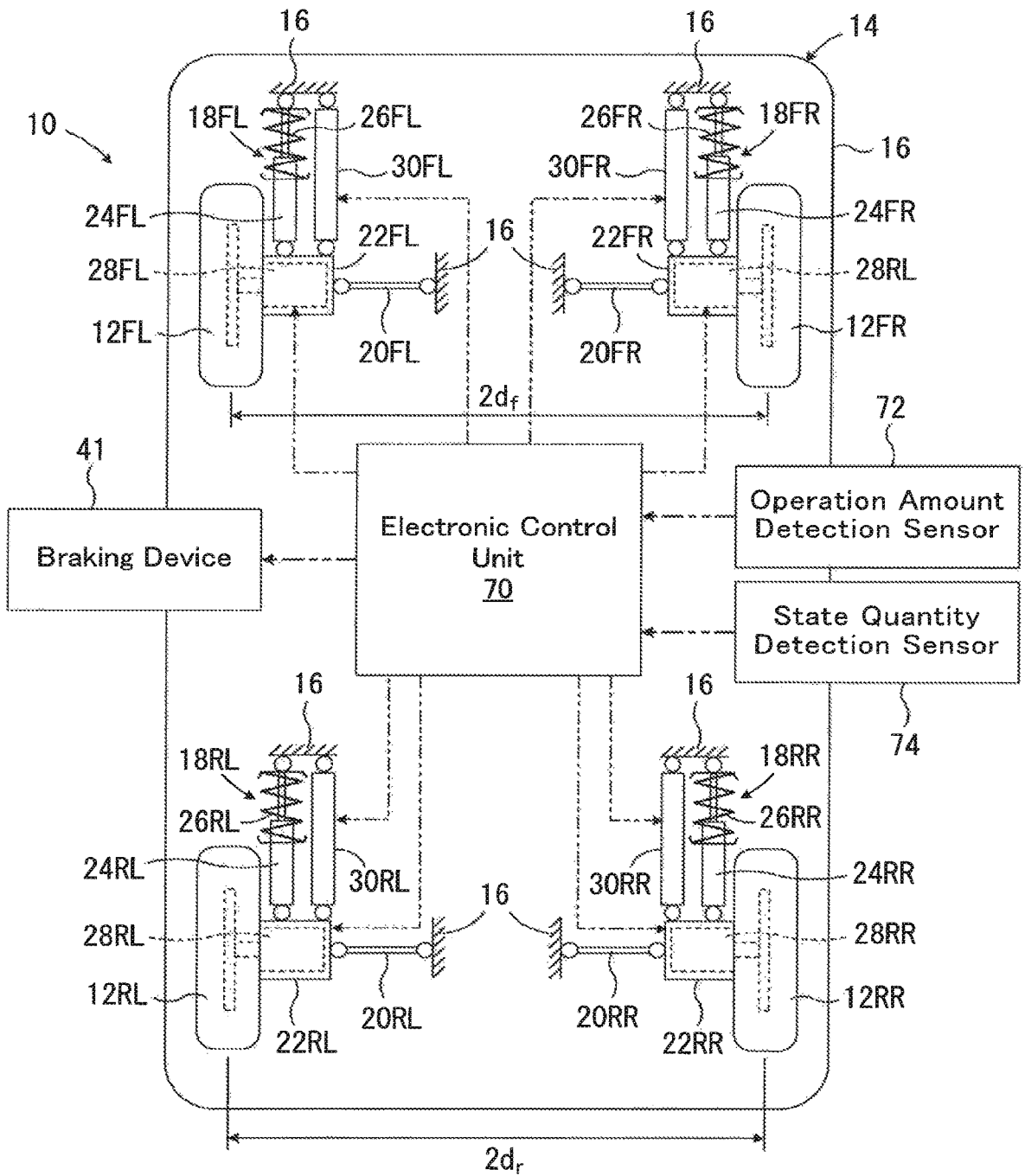
FIG. 1 is a schematic configuration diagram showing a first embodiment of a vehicle attitude control apparatus according to the present disclosure.

In FIG. 1, a vehicle attitude control apparatus according to an embodiment of the present disclosure is indicated generally by reference numeral 10. The attitude control apparatus 10 is applied to a vehicle 14 having left and right front wheels 12FL and 12FR which are steered wheels and left and right rear wheels 12RL and 12RR which are non-steered wheels. The vehicle 14 has front suspensions 18FL and 18FR which respectively suspend the front wheels 12FL and 12FR from a vehicle body 16 and rear suspensions 18RL and 18RR which respectively suspend the rear wheels 12RL and 12RR from the vehicle body 16.

The front suspensions 18FL and 18FR include suspension arms 20FL and 20FR, respectively and the rear suspensions 18RL and 18RR include suspension arms 20RL and 20RR, respectively. In FIG. 1, only one each of the suspension arms 20FL to 20RR is shown, but a plurality of these arms may be provided.

The front wheels 12FL and 12FR are supported by wheel support members 22FL and 22FR, respectively, rotatably around rotation axes (not shown), and the wheel support members 22FL and 22FR are connected to the vehicle body 16 by the suspension arms 20FL and 20FR, respectively. Likewise, the rear wheels 12RL and 12RR are supported by wheel support members 22RL and 22RR, respectively, rotatably around rotation axes (not shown), and the wheel support members 22RL and 22RR are connected to the vehicle body 16 by the suspension arms 20RL and 20RR, respectively.

The front suspensions 18FL and 18FR include shock absorbers 24FL and 24FR and suspension springs 26FL and 26FR, respectively. Likewise, the rear suspensions 18RL and 18RR include shock absorbers 24RL and 24RR and suspension springs 26RL and 26RR, respectively. Although damping coefficients of the shock absorbers 24FL to 24RR are constant, these shock absorbers may be of variable damping force type.

In the illustrated embodiment, the shock absorbers 24FL and 24FR are respectively connected to the vehicle body 16 at the upper ends and to the wheel support members 22FL and 22FR at the lower ends. The suspension springs 26FL and 26FR are elastically mounted between the vehicle body 16 and the wheel support members 22FL and 22FR via the shock absorbers 24FL and 24FR, respectively. However, the shock absorber 24FL and the suspension spring 26FL may be disposed between the vehicle body 16 and the wheel support member 22FL or the suspension arm 20FL, and the shock absorber 24FR and the suspension spring 26FR may be disposed between the vehicle body 16 and the wheel support member 22FR or the suspension arm 20FR.

Similarly, the shock absorbers 24RL and 24RR are respectively connected to the vehicle body 16 at the upper ends and to the wheel support members 22RL and 22RR at the lower ends. The suspension springs 26RL and 26RR are elastically mounted between the vehicle body 16 and the wheel support members 22RL and 22RR via the shock absorbers 24RL and 24RR, respectively. However, the shock absorber 24RL and the suspension spring 26RL may be disposed between the vehicle body 16 and the wheel support member 22RL or the suspension arm 20RL, and the shock absorber 24RR and the suspension spring 26RR may be disposed between the vehicle body 16 and the wheel support member 22RR or the suspension arm 20RR.

The suspensions 18FL to 18RR may be arbitrary independent suspension type suspensions as long as the wheels 12FL to 12RR and the vehicle body 16 are allowed to displace in the vertical direction with respect to each other. In addition, the suspension springs 26FL to 26RR may be arbitrary springs such as compression coil springs, air springs, and the like.

The wheel support members 22FL and 22FR incorporate in-wheel motors 28FL and 28FR, respectively. The in-wheel motors 28FL and 28FR are driving power sources and apply positive braking/driving forces (driving forces) FbdFL and FbdFR to the front wheels 12FL and 12FR, respectively, via deceleration gears not shown in the figure. Similarly, the wheel support members 22RL and 22RR incorporate in-wheel motors 28RL and 28RR, respectively. The in-wheel motors 28RL and 28RR are driving power sources, and apply positive braking/driving forces (driving forces) FdRL and FdRR to the rear wheels 12RL and 12RR, respectively, via deceleration gears not shown in the figure. The in-wheel motors 28FL to 28RR are AC synchronous motors, and each function as a drive device that applies driving force independently to the wheels 12FL to 12RR. Driving forces applied to the wheels 12FL to 12RR are controlled by controlling control currents supplied to the in-wheel motors.

Figure 2:
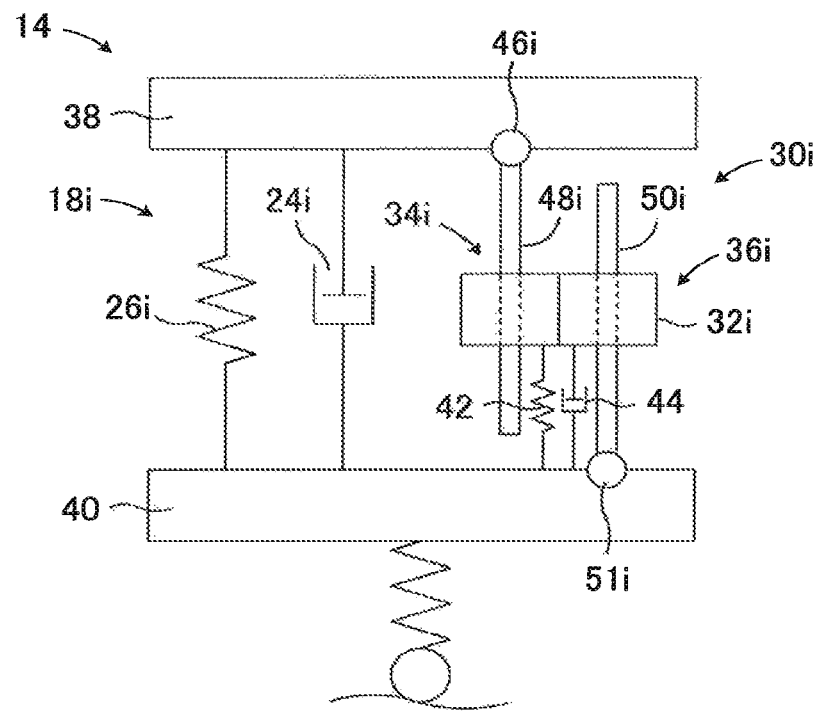
FIG. 2 is a view showing a suspension including an active suspension device of the first embodiment as a single wheel model.

As understood from the above description, at least the vehicle body 16 constitutes a sprung mass 38 of the vehicle 14, and at least the wheels 12FL to 12RR, the wheel support members 22FL to 22RR and the in-wheel motors 28FL to 28RR constitute unsprung masses 40 of the vehicle 14 (see FIG. 2).

Although not shown in detail in FIG. 1, the vehicle 14 is provided with a braking device 41. The braking device 41 may have any structure known in the art and is configured so as to be able to impart braking forces (negative braking/driving forces) independently to the wheels 12FL to 12RR. Note that the in-wheel motors 28FL to 28RR may be configured to perform regenerative braking when the vehicle is braked. The in-wheel motors 28FL to 28RR and the braking device 41 constitute a braking/driving device for imparting braking/driving forces to the wheels 12FL to 12RR.

Further, the suspensions 18FL to 18RR include active suspension devices 30FL to 30RR capable of changing vertical force acting between the sprung mass and the unsprung masses at the positions of the wheels 12FL to 12RR, respectively. In the first embodiment, the active suspension devices 30FL to 30RR are linear motor type active suspension devices.

FIG. 2 shows a suspension 18$i$ (i=FL, FR, RL and RR) as a single wheel model. FL, FR, RL and RR mean the front left wheel, the front right wheel, the rear left wheel and the rear right wheel, respectively. As shown in FIG. 2, each active suspension device 30$i$ includes a mass body 32$i$, an upper actuator 34$i$, and a lower actuator 36$i$. The mass body 32$i$ is disposed between a sprung mass 38 and an unsprung mass 40 of the vehicle 14 and supported so as to be displaceable in the vertical direction with respect to the sprung and unsprung masses. The mass body 32$i$ is supported by the unsprung mass via a spring system 42 and a damping system 44 fixed to the unsprung mass 40.

Therefore, when the active suspension devices 30FL to 30RR are not operated, the mass body can be supported by the unsprung mass 40 via the spring system 42 and the damping system 44. Therefore, it is possible to hold the mass body 32$i$ in a predetermined relationship with the upper actuator 34$i$, the lower actuator 36$i$, the sprung mass 38 and the unsprung mass 40.

When the active suspension device 30$i$ is operated, the mass body 32$i$ receives an urging force from the upper actuator 34$i$ and the lower actuator 36$i$, so that the support of the mass body by the spring system 42 and the damping system 44 is substantially unnecessary. Therefore, the spring system and the damping system supporting the mass body 32$i$ may have a function of maintaining the mass body in a predetermined position in a situation where the active suspension device 30$i$ is not operating. In addition, when the active suspension device 30$i$ operates, the spring force of the spring system supporting the mass body 32$i$ and the damping force of the damping system may be reduced. The mass of the mass body 32$i$ is smaller than the mass of the sprung mass 38 (vehicle body 16) and the mass of the unsprung mass 40 (each wheel 12$i$).

Figure 4A:
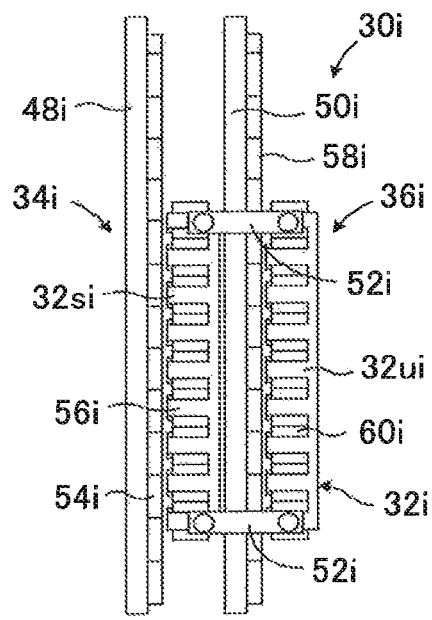
FIGS. 4A to 4D are enlarged partial views showing main portions of various active suspension devices having different configurations in the first embodiment.

The upper actuator 34$i$ includes an upper support plate 48$i$ attached to the sprung mass 38 in a cantilevered state via a ball joint 46$i$ and extending downward. The lower actuator 36$i$ includes a lower support plate 50$i$ attached to the unsprung mass 40 in a cantilevered state via a ball joint 51$i$ and extending upward. As shown in FIG. 4A, the mass body 32$i$ is composed of a mass body 32$si$ and a mass body 32$ui$, and the mass bodies 32$si$ and 32$ui$ are integrally connected by connecting members 52$i$.

Figure 3:
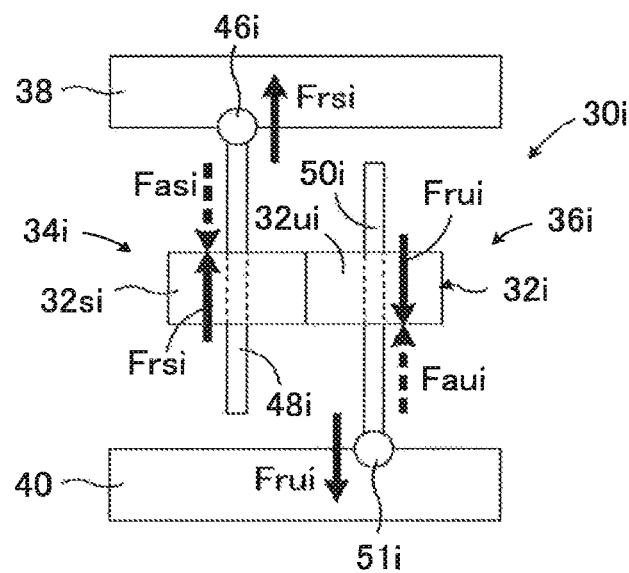
FIG. 3 is an enlarged view showing the active suspension device shown in FIG. 2.

A plurality of electromagnetic coils 54$i$ arranged in the vertical direction and configured to have alternately opposite magnetic poles are fixed on the surface of the upper support plate 48$i$ facing the lower support plate 50$i$. A plurality of permanent magnets 56$i$ arranged in the vertical direction are fixed to the mass body 32$si$ so as to have magnetic poles alternately opposite to each other and to face the electromagnetic coils. Therefore, as shown in FIG. 3, the upper actuator 34$i$ constitutes an upper linear motor which applies a vertical urging force Fasi to the mass body 32$si$ and transmits a reaction force Frsi to the sprung mass 38 in cooperation with the mass body 32. The reaction force Frsi is a force whose magnitude is the same as the urging force Fasi and whose direction is opposite.

Likewise, a plurality of electromagnetic coils 58$i$ arranged in the vertical direction and having opposite magnetic poles are fixed on the surface of the lower support plate 50$i$ on the side opposite to the upper support plate 48$i$. A plurality of permanent magnets 60$i$ arranged in the vertical direction are fixed to the mass body 32$ui$ so as to have magnetic poles alternately opposite to each other and to face the electromagnetic coils. Therefore, as shown in FIG. 3, the lower actuator 36$i$ constitutes a lower linear motor which applies a vertical urging force Faui to the mass body 32$ui$ and transmits a reaction force Frui to the unsprung mass 40 in cooperation with the mass body 32$ui$. The reaction force Frui is a force whose magnitude is the same as the urging force Faui and whose direction is opposite.

Although not shown in the drawings, masses of the sprung mass 38, the unsprung mass 40 and the mass body 32$i$ are assumed to be ms, mu and mm, respectively. Displacement, velocity and acceleration of the sprung mass 38 are assumed to be $z_s$, $z_s$d and $z_s$dd, respectively; displacement, velocity and acceleration of the unsprung mass 40 are assumed to be $z_u$, $z_u$d and $z_u$dd, respectively; and displacement, velocity and acceleration of the mass body 32$i$ are assumed to be $z_m$, $z_m$d and $z_m$dd. Damping coefficient of the shock absorber 24$i$ and spring constant of the suspension spring 26$i$ are assumed to be C and K, respectively, and spring constant of the spring system 42 and damping coefficient of the damping system 44 are assumed to be k and c, respectively. Spring constant of a tire of each wheel 12$i$ is assumed to be $K_t$ and road surface displacement is assumed to be $z_0$. Motion equations of the sprung mass 38, the unsprung mass 40 and the mass body 32$i$ are expressed by the following equations (1) to (3), respectively, with upward displacement, velocity and acceleration as positive displacement, velocity and acceleration, respectively.

$$m_s dd + C(z_s d - z_u d) + K(z_s - z_u) = Frsi \quad (1)$$

$$m_u z_u dd + C(z_u d - z_s d) + K(z_u - z_s) + \\ K_t z_u + c(z_u d - z_m d) + k(z_u - z_m) = Frui + K_t z_0 \quad (2)$$

$$m_m z_m dd + c(z_u d - z_m d) + k(z_u - z_m) = Fasi + Faui = -Frsi - Frui \quad (3)$$

As is seen from the above equations (1) to (3), the sprung mass 38 receives the reaction force Frsi from the mass body 32$i$ and the unsprung mass 40 substantially receives the reaction force Frui from the mass body 32$i$, but the reaction forces Frsi and Frui are mutually unaffected forces. In other words, there is no correlation between the urging force Fasi applied to the mass body 32$si$ by the upper actuator 34$i$ and the reaction force Frui received by the unsprung mass 40 from the mass body 32$i$. Similarly, there is no correlation between the urging force Faui applied to the mass body 32$si$ by the lower actuator 36$i$ and the reaction force Frsi received by the sprung mass 38 from the mass body 32$i$.

In the following description, the reaction forces Frsi and Frui will be referred to as actively generated forces Frsi and Frui as necessary. Therefore, the upper actuator 34$i$ and the lower actuator 36$i$ are configured to transmit actively generated forces Frsi and Frui to the sprung mass 38 and the unsprung mass 40 by applying urging forces to the mass bodies 32$si$ and 32$ui$, respectively. The actively generated forces Frsi and Frui are controlled by controlling control current supplied to the electromagnetic coils 54$i$ of the upper actuators 34$i$ and the electromagnetic coils 58$i$ of the lower actuators 36$i$, respectively.

Figure 4B:
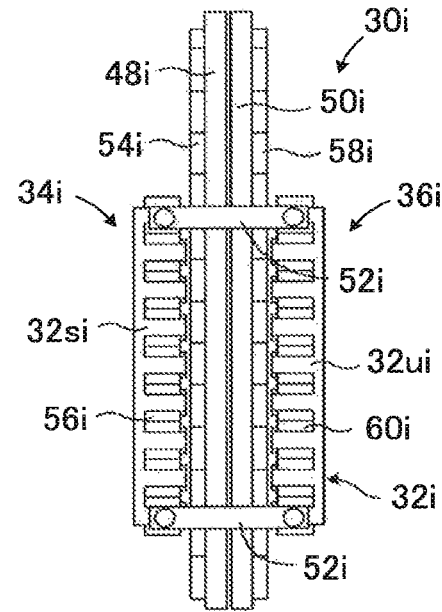
Figure 4C:
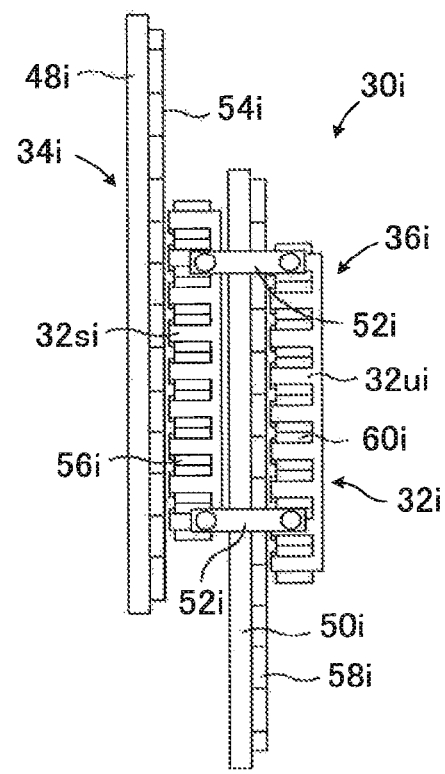
Figure 4D:
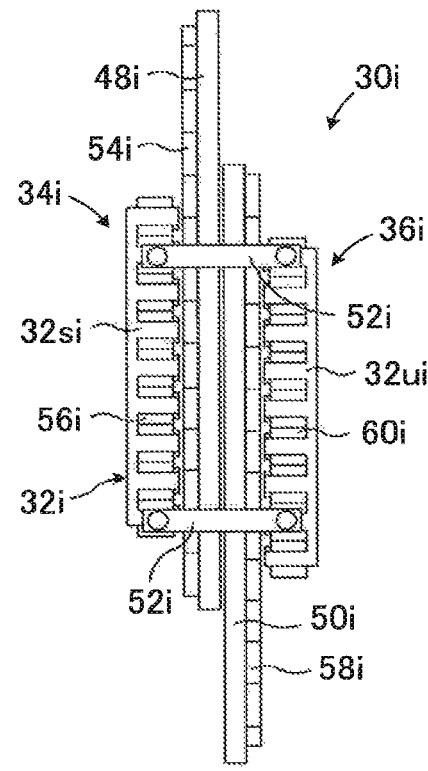

FIGS. 4B to 4D show modifications of the active suspension devices 30$i$. In the modification shown in FIG. 4B, the electromagnetic coils 54$i$ and 58$i$ are fixed to the surfaces of the upper support plate 48$i$ and the lower support plate 50$i$ opposite to the mutually facing surfaces. Therefore, the permanent magnets 56$i$ and 60$i$ are fixed to the mutually facing surfaces of the mass bodies 32$si$ and 32$ui$. The modifications shown in FIGS. 4C and 4D are configured similarly to the active suspension apparatus shown in FIGS. 4A and 4B, respectively, except that the mass bodies 32$si$ are offset upward with respect to the mass bodies 32$ui$.

Although not shown in FIGS. 2 to 4, the active suspension devices 30$i$ may include means for ensuring a situation in which the permanent magnets 56$i$ and 60$i$ are displaced relative to each other in the vertical direction without coming into contact with the electromagnetic coils 54$i$ and 58$i$, respectively. For example, rollers (not shown) supported by a connecting member 52$i$ may be adapted to roll along the upper support plates 48$i$ and the lower support plates 50$i$, preferably on both sides of the plates 48$i$ and 50$i$.

Furthermore, upon receiving the urging forces Fasi, the mass bodies 32$si$ are displaced along the upper support plates 48$i$. Thus, although not shown in FIGS. 2 to 4, there may be provided an upper stroke, limiter and a lower stroke limiter that respectively limit upward displacement and downward displacement of each mass body 32$si$ with respect to the upper support plate 48$i$. Likewise, upon receiving the urging forces Faui, the mass bodies 32$ui$ are displaced along the lower support plates 50$i$. Thus, although not shown in FIGS. 2 to 4, there may be provided an upper stroke limiter and a lower stroke limiter that respectively limit upward displacement and downward displacement of each mass body 32$ui$ with respect to the lower support plate 50$i$. Regarding general road surface input when a vehicle such as an automobile travels, the upward displacement and the downward displacement of mass bodies 32$si$ and 32$ui$ are about 10 cm.

The upper support plate 48$i$ and the lower support plate 50$i$ shown in FIGS. 2 to 4 are flat plates. However, the upper support plate 48$i$ and the lower support plate 50$i$ may be curved when viewed in the front-rear direction of the vehicle 14 or may be curved when viewed in the vertical direction. The upper support plate 48$i$ and the lower support plate 50$i$ may be directly fixed to the sprung mass 38 and the unsprung mass 40 without via the ball joints 46$i$ and 51$i$, respectively, preferably elastically deformable with respect to the sprung mass and the unsprung mass.

Figure 5:
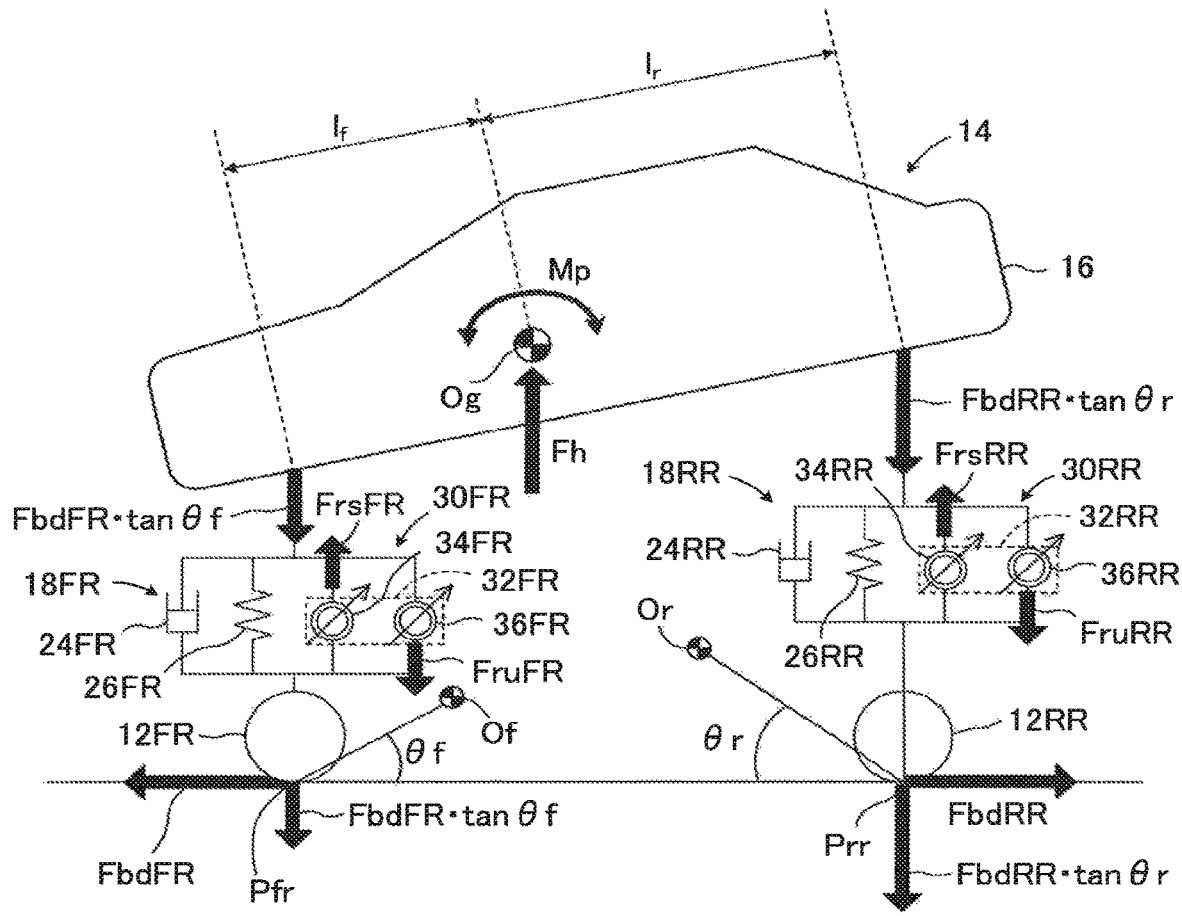
FIG. 5 is a view for explaining forces acting on a vehicle with respect to a two-wheel model in which a right half of a vehicle is viewed in a lateral direction.

FIG. 5 is a diagram for explaining vertical forces acting on the vehicle with respect to a two-wheel model in which the right half of the vehicle 14 is viewed in the lateral direction. In the description of FIG. 5, the right half of the vehicle 14 will be described, but the left half of the vehicle is the same as the right half.

It is assumed that in FIG. 5, an instantaneous rotation center Of of the right front wheel 12FR is located rearward and above the ground contact point Pfr of the right front wheel, and an instantaneous rotation center Or of the right rear wheel 12RR is located at the front and above with respect to the ground contact point Prr of the right rear wheel. Further, an angle formed by a line segment connecting the instantaneous rotation center Of and the ground point Pfr with respect to the horizontal direction is assumed to be θf, and an angle formed by a line segment connecting the instantaneous rotation center Or and the ground point Prr with respect to the horizontal direction is assumed to be θr.

As is well known, when a braking/driving force FbdFR which is positive (in the forward direction), that is, a driving force is applied to the right front wheel 12FR, the downward vertical force FbdFR·tan θf is generated by the suspension 18FR and transmitted to the vehicle body 16. When the braking/driving force FbdFR is a driving force which is negative (in the reverse direction), that is, a braking force, the vertical force FbdFR·tan θf is an upward vertical force.

On the other hand, when a negative braking/driving force FbdRR, that is, a braking force is applied to the right rear wheel 12RR, a downward vertical force FbdRR·tan θr is generated by the suspension 18RR and transmitted to the vehicle body 16. When the braking/driving force FbdFR is a positive braking/driving force, the vertical force FbdRR·tan θr becomes an upward vertical force.

As described above, the front suspension 18FR is provided with an active suspension device 30FR having an upper actuator 34FR and a lower actuator 36FR. The upper actuator 34FR generates an actively generated force FrsFR, and the lower actuator 36FR generates an actively generated force FruFR. The actively generated forces FrsFR and FruFR are transmitted to the vehicle body 16 and the right front wheel 12FR (unsprung mass), respectively.

Likewise, the rear suspension 18RR is provided with an active suspension device 30RR having an upper actuator 34RR and a lower actuator 36RR. The upper actuator 34RR generates an actively generated force FrsRR, and the lower actuator 36RR generates an actively generated force FruRR. The actively generated forces FrsRR and FruRR are transmitted to the vehicle body 16 and the right rear wheel 12RR (unsprung mass), respectively.

Therefore, a heave force Fh due to the above-described various vertical forces acts on a center of gravity Og of the vehicle 14, and a pitch moment Mp due to the difference between the vertical forces on the front wheel side and the vertical forces on the rear wheel side acts around the center of gravity Og. In addition, a roll moment Mr (not shown) due to the difference between the vertical forces of the right front and rear wheels and the vertical forces of the left front and rear wheels acts around the center of gravity Og, and a yaw moment Mw (not shown) due to the difference between the braking/driving forces of the right front and rear wheels and the braking/driving forces of the left front and rear wheels acts around the center of gravity Og. Further, a longitudinal force Fbd (not shown) corresponding to a sum of the braking/driving forces Fbdi of the four wheels acts on the vehicle 14.

The Heave force Fh, the roll moment Mr, the pitch moment Mp, and the yaw moment Mw respectively change the attitude of the heave, roll, pitch and yaw of the vehicle 14, and the longitudinal force Fd changes the acceleration/deceleration of the vehicle 14. Therefore, the in-wheel motors 28FL to 28RR, the braking device 41, and the active suspension devices 30FL to 30RR (the upper actuator 34i and the lower actuator 36i) that change the heave force Fh or the like by changing the vertical force function as attitude control devices.

The in-wheel motors 28FL to 28RR, the braking device 41, the upper actuator 34i and the lower actuator 36i are controlled by an electronic control unit 70, so that the electronic control unit 70 functions as a control unit for controlling the attitude control devices. Although not shown in detail in FIG. 1, the electronic control unit 70 includes a microcomputer and a drive circuit. The microcomputer has a general configuration in which a CPU, a ROM, a RAM and an input/output port device are mutually connected by a bi-directional common bus. The drive circuit may include a power supply battery, an inverter and the like. A control program (see FIG. 6) for controlling the attitude control devices is stored in the ROM, and the attitude control device is controlled by the CPU according to the control program.

As shown in FIG. 1, signals indicating driving operation amounts of a driver are input from an operation amount detection sensor 72 to the electronic control unit 70 and signals indicating running state quantities of the vehicle 14 are input from a state quantity detection sensor 74 to the electronic control unit. The driving operation amounts include a steering angle indicating a steering operation amount of the driver, an accelerator opening degree indicating a driving operation amount of the driver, a master cylinder pressure indicating a braking operation amount of the driver, and the like. The running state quantities include a vehicle speed which is a moving speed of the vehicle 14, and a roll rate, a pitch rate and a yaw rate of the vehicle body 16, and the like.

In order to control the attitude of the vehicle 14 to a preferable attitude, the heave force Fh, the roll moment Mr, the pitch moment Mp, and the yaw moment Mw must be controlled so as to be a target vertical force Fz, a target roll moment Mx, a target pitch moment My and a target yaw moment Mz, respectively, which are respective target values. In addition, in order to control the acceleration/deceleration of the vehicle 14 according to the acceleration/deceleration operation of the driver, the longitudinal force Fd must be controlled so as to be a target longitudinal force Fx which is a target value.

Notably, the target vertical force Fz, the target roll moment Mx, the target pitch moment My, the target yaw moment Mz, and the target longitudinal force Fx are determined by the driver's operation amount and a target attitude of the vehicle, and are well known in the art as to how to obtain them. Therefore, since the target vertical force Fz and the like may be calculated in a manner known in the art, description of calculation of the target vertical force Fz and the like is omitted.

Therefore, the electronic control unit 70 controls the attitude control devices so that the heave force Fh and the moments Mr, Mp, Mw become the target vertical force Fz, the target roll moment Mx, the target pitch moment My and the target yaw moment Mz, respectively, and the longitudinal force Fd becomes the target longitudinal force Fx. The target vertical force Fz is a target heave force along a vertical axis passing through the center of gravity Og of the vehicle 14 and the target roll moment Mx is a target moment around a longitudinal axis (roll axis) passing through the center of gravity Og of the vehicle. The target pitch moment My is a target moment around a lateral axis (pitch axis) passing through the center of gravity Og of the vehicle, and the target yaw moment Mz is a target moment around the vertical axis (yaw axis) passing through the center of gravity Og of the vehicle.

The transformation matrix [A] is determined according to the number and position of the attitude control devices, and in the first embodiment, it is expressed by the following equation (5).

$$\begin{bmatrix} a_f\cos\delta & a_f\cos\delta & -1 & -1 & -1 & -1 & 0 & 0 & 0 & 0 \\ d_f a_f\cos\delta & -d_f a_f\cos\delta & d_f & -d_f & d_r & -d_r & 0 & 0 & 0 & 0 \\ -l_f a_f\cos\delta & -l_f a_f\cos\delta & -l_f & -l_f & l_r & l_r & 0 & 0 & 0 & 0 \\ -d_f\cos\delta + l_f\sin\delta & d_f\cos\delta + l_f\sin\delta & 0 & 0 & 0 & 0 & 0 & 0 & 0 & 0 \\ 1 & 1 & 0 & 0 & 0 & 0 & 0 & 0 & 0 & 0 \\ -a_f\cos\delta & 0 & 0 & 0 & 0 & 0 & -1 & 0 & 0 & 0 \\ 0 & -a_f\cos\delta & 0 & 0 & 0 & 0 & 0 & -1 & 0 & 0 \\ 0 & 0 & 0 & 0 & 0 & 0 & 0 & 0 & -1 & 0 \\ 0 & 0 & 0 & 0 & 0 & 0 & 0 & 0 & 0 & -1 \end{bmatrix} \tag{5}$$

As described above, the in-wheel motors 28FL to 28RR and the braking device 41 cooperate with each other to impart braking/driving forces to the respective wheels independently of each other wheel, so that it can be considered that a braking/driving device is provided for each wheel. Therefore, the number of attitude control devices is 12 while the number of degrees of freedom of attitude control (the number of target motion state quantities) is 5, so that the number of attitude control devices is larger than the number of degrees of freedom of attitude control. Consequently, since the target control force of each attitude control device cannot, be obtained by solving the same number of motion equations as the number of degrees of freedom of attitude control, in the present disclosure, the target control force of each attitude control device is obtained as follows.

A vector including the target vertical force Fz, the target roll moment Mx, the target pitch moment My, the target yaw moment Mz, and the target longitudinal force Fx is referred to as a target value vector. A vector including control braking/driving forces Fdi, actively generated forces Fsi, and actively generated forces Fui of the left and right front wheels and the right and left rear wheels is referred to as a control force vector {Fc} for driving the attitude control devices. The control braking/driving forces Fdi are target values of the braking/driving forces Fbdi, and the actively generated forces Fdi and Fui are target values of the actively generated forces Frdi and Frui, respectively.

Assuming that [A] is a transformation matrix for converting the control force vector {Fc} to the target value vector, the following equation (4) holds.

$$[A]\{Fc\} = [A]\begin{Bmatrix} FdFL \\ FdFR \\ FdRL \\ FdRR \\ FsFL \\ FsFR \\ FsRL \\ FsRR \\ FuFL \\ FuFR \\ FuRL \\ FuRR \end{Bmatrix} = \begin{Bmatrix} Fz \\ Mx \\ My \\ Mz \\ Fx \end{Bmatrix} \tag{4}$$

Here, $a_f$ is an anti-dive (lift) coefficient of the front suspensions, and equals to tan θf. $a_r$ is an anti-dive (lift) coefficient of the rear suspensions, and equals to tan θr. For θf and θr, see FIG. 5. δ is a steered angle of the front wheels. $d_f$ is one-half of a front tread of the vehicle 14, and $d_r$ is one half of a rear tread of the vehicle (see FIG. 1). $l_f$ is a distance in the front-rear direction between the center of gravity Og of the vehicle 14 and an axle of the front wheels, and lr is the distance in the front-rear direction between the center of gravity of the vehicle and an axle of the rear wheels (see FIG. 5).

From the above equation (4), the following equation (6) holds. That is, the control force vector {Fc} can be calculated as a product of the pseudoinverse matrix (generalized inverse matrix) of the transformation matrix [A] and the target value vector. The pseudoinverse matrix (generalized inverse matrix) of the transformation matrix [A] is $[A]^T([A][A]^T)^{-1}$.

$$\begin{Bmatrix} FdFL \\ FdFR \\ FdRL \\ FdRR \\ FsFL \\ FsFR \\ FsRL \\ FsRR \\ FuFL \\ FuFR \\ FuRL \\ FuRR \end{Bmatrix} = [A]^T([A][A]^T)^{-1}\begin{Bmatrix} Fz \\ Mx \\ My \\ Mz \\ Fx \end{Bmatrix} \tag{6}$$

In the calculation of the control force vector {Fc} according to the above equation (6), a control force vector {Fc} is calculated so that a square norm of the control force vector {Fc} represented by the following equation (7) becomes minimum and the five target motion state quantities of the target value vector are achieved. Accordingly, energy required for the attitude control is minimized, which enables to reduce the power consumed by the attitude control.

$$\|Fc\|_2 = (FdFL^2 + FdFR^2 + FdRL^2 + FdRR^2 + FsFL^2 + FsFR^2 + FsRL^2 + FsRR^2 + FuFL^2 + FuFR^2 + FuRL^2 + FuRR^2)^{1/2} \tag{7}$$

The electronic control unit 70 calculates five target motion state quantities based on a running state of the vehicle and calculates the control force vector {Fc} according to the above equations (6) and (7). Further, the electronic control unit 70 controls the in-wheel motors 28FL to 28RR, the upper actuator 34i and the lower actuator 36i based on the control force vector {Fc}, whereby controls the five motion state quantities to conform to the corresponding target motion state quantities.

Figure 6:
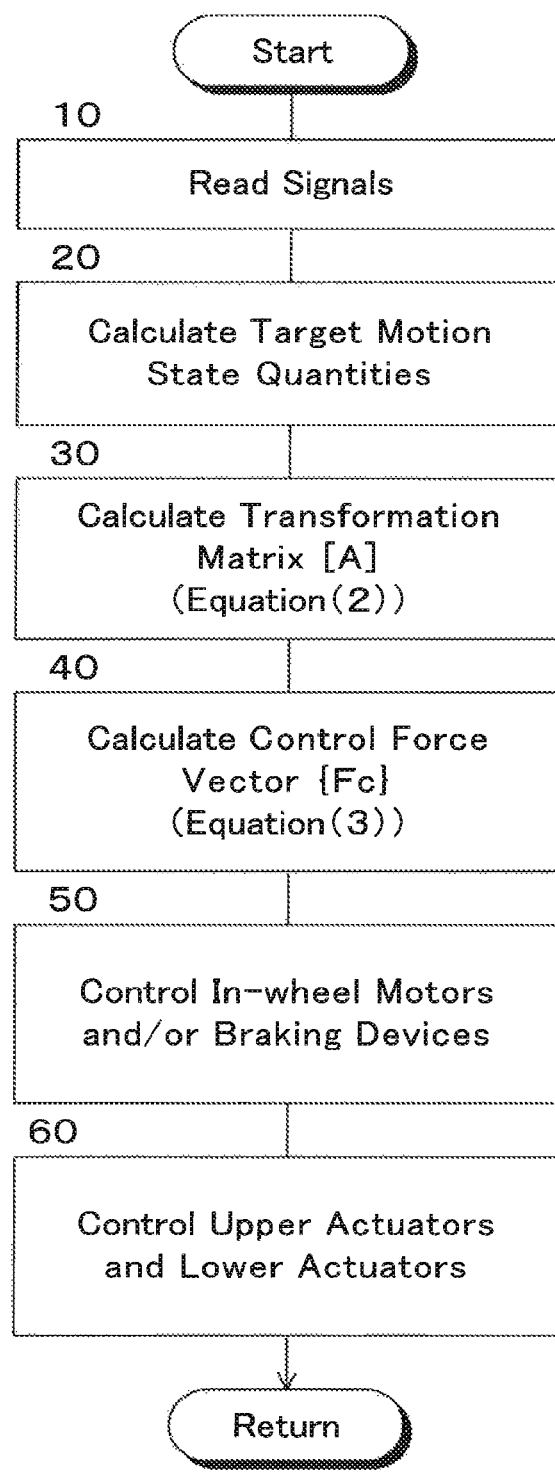
FIG. 6 is a flowchart showing an attitude control routine according to the first embodiment.

Next, with reference to the flowchart shown in FIG. 6, the calculation of the target motion state quantity and the control of the attitude control devices such as the in-wheel motors 28FL to 28RR will be described. The control according to the flowchart shown in FIG. 6 is repeatedly executed at predetermined time intervals by the electronic control unit 70 when an ignition switch (not shown) is ON.

First, in step 10, a signal indicating a steering angle, a signal indicating an accelerator opening, a signal indicating a master cylinder pressure and the like are read as signals indicating driving operation amounts of a driver detected by the operation amount detection sensor 72. As signals indicating running state quantities of the vehicle 14 detected by the state quantity detection sensor 74, a signal indicating a vehicle speed, a signal indicating a roll rate of the vehicle body 16, a signal indicating a pitch rate of the vehicle body, and a signal indicating a yaw rate of the vehicle are read.

In step 20, a target value vector, that is, a target vertical force Fz, a target roll moment Mx, a target pitch moment My, a target yaw moment Mz, and a target longitudinal force Fx are calculated in a manner known in the art.

In step 30, a transformation matrix [A] for transforming a control force vector {Fc} to the target value vector is computed according to the above equation (5). A steered angle δ of the front wheels is calculated based on the steering angle θ.

In step 40, a control force vector {Fc} is calculated according to the above equation (6). That is, control braking/driving forces FdFL, FdFR, FdRL and FdRR, actively generated forces FsFL, FsFR, FsRL and FsRR and actively generated forces FuFL, FuFR, FuRL and FuRR are calculated.

In step 50, the in-wheel motors 28FL to 28RR and/or the braking device 41 are controlled so that braking/driving forces FbdFL, FbdFR, FbdRL and FbdRR of the wheels 12FL to 12RR become the control braking/driving forces FdFL, FdFR, FdRL and FdRR, respectively.

In step 60, the upper actuators 34i are controlled so that actively generated forces Frsi of the upper actuators 34i become the actively generated forces Fsi. In addition, the lower actuators 36i are controlled so that actively generated forces Frui of the lower actuators 36i become the actively generated force Fui.

Thus, in step 20, a target vertical force Fz, a target roll moment Mx, a target pitch moment My, a target yaw moment Mz, and a target longitudinal force Fx are calculated. In steps 30 and 40, control braking/driving forces Fdi, and actively generated forces Fsi and Fui are calculated. Then, in step 50, the in-wheel motors 28FL to 28RR and/or the braking device 41 are controlled so that braking/driving forces Fbdi of the wheels 12FL to 12RR becomes the control braking/driving forces Fdi. Further, in step 60, actively generated forces Frsi of the upper actuators 34i are controlled so as to become the actively generated forces Fsi, and actively generated forces Frui of the lower actuators 36i are controlled so as to become the actively generated forces Fui.

Figure 7:
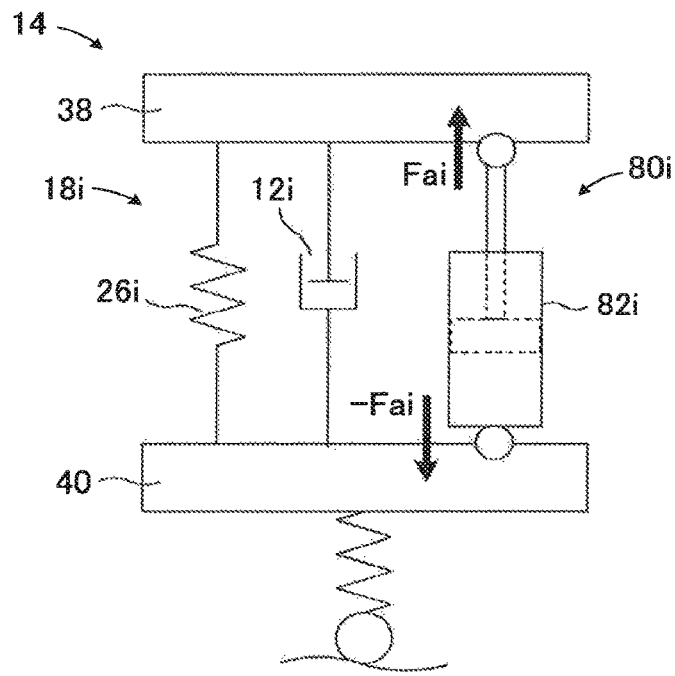
FIG. 7 is a view similar to FIG. 2 showing a known active suspension device.

FIG. 7 is a view similar to FIG. 2 showing an active suspension device 80i known in the art, such as the active suspension device described in the aforementioned Japanese Patent Application Laid-open Publication No. 2016-883596. As shown in FIG. 7, the known active suspension device 80i includes one actuator 82i disposed between the sprung mass 38 and the unsprung mass 40 of the vehicle 14. The actuator 82i is an actuator of the variable axial force type, and by applying an axial force, applies upward and downward forces Fai and —Fai having the same magnitude and acting in the opposite directions to the sprung mass 38 and the unsprung mass 40, respectively.

It is conceivable to apply the same control method as in the first embodiment to attitude control of the vehicle in which the known active suspension device 80i shown in FIG. 7 is incorporated in the suspension 18i of each wheel. That is, it is conceivable to calculate the control braking/driving forces Fdi and the actively generated forces Fai according to the following equations (8) to (10) corresponding to the above equations (3), (4) and (2). This control is referred to as control related to the present disclosure.

$$\begin{Bmatrix} FdFL \\ FdFR \\ FdRL \\ FdRR \\ FaFL \\ FaFR \\ FaRL \\ FaRR \end{Bmatrix} = [A]^T ([A][A]^T)^{-1} \begin{Bmatrix} Fz \\ Mx \\ My \\ Mz \\ Fx \end{Bmatrix} \quad (8)$$

$$\|Fc\|_2 = (FdFL^2 + FdFR^2 + FdRL^2 + FdRR^2 + FaFL^2 + FaFR^2 + FaRL^2 + FaRR^2)^{1/2} \quad (9)$$

$$[A] = \begin{bmatrix} a_f \cos\delta & a_f \cos\delta & a_r & a_r & 1 & 1 & 1 & 1 \\ d_f a_f \cos\delta & -d_f a_f \cos\delta & d_r a_r & -d_r a_r & d_f & -d_f & d_r & -d_r \\ -l_f a_f \cos\delta & -l_f a_f \cos\delta & l_r a_r & l_r a_r & -l_f & -l_f & l_r & l_r \\ -d_f \cos\delta + l_f \sin\delta & d_f \cos\delta + l_f \sin\delta & -d_r & d_r & 0 & 0 & 0 & 0 \\ 1 & 1 & 1 & 1 & 0 & 0 & 0 & 0 \end{bmatrix} \quad (10)$$

Control forces applied by each actuator $82i$ to the sprung mass 38 and the unsprung mass 40 are vertical forces having the same magnitude but acting in the opposite directions. Therefore, in the control related to the present disclosure, even if each actuator $82i$ is controlled, the control force acting on the sprung portion 38 and the control force acting on the unsprung portion 40 cannot be controlled independently of each other.

On the other hand, according to the first embodiment, the actively generated forces Fsi are applied to the sprung mass 38 by the upper actuator $34i$, and the actively generated forces Fui are applied to the unsprung mass 40 by the lower actuator $36i$. Therefore, as compared with where a vertical force having the same magnitude but acting in the opposite directions are applied to the sprung and unsprung masses by each actuator $82i$ at the position of each wheel, the attitude of the vehicle body can be controlled to a more desired attitude.

Figure 8:
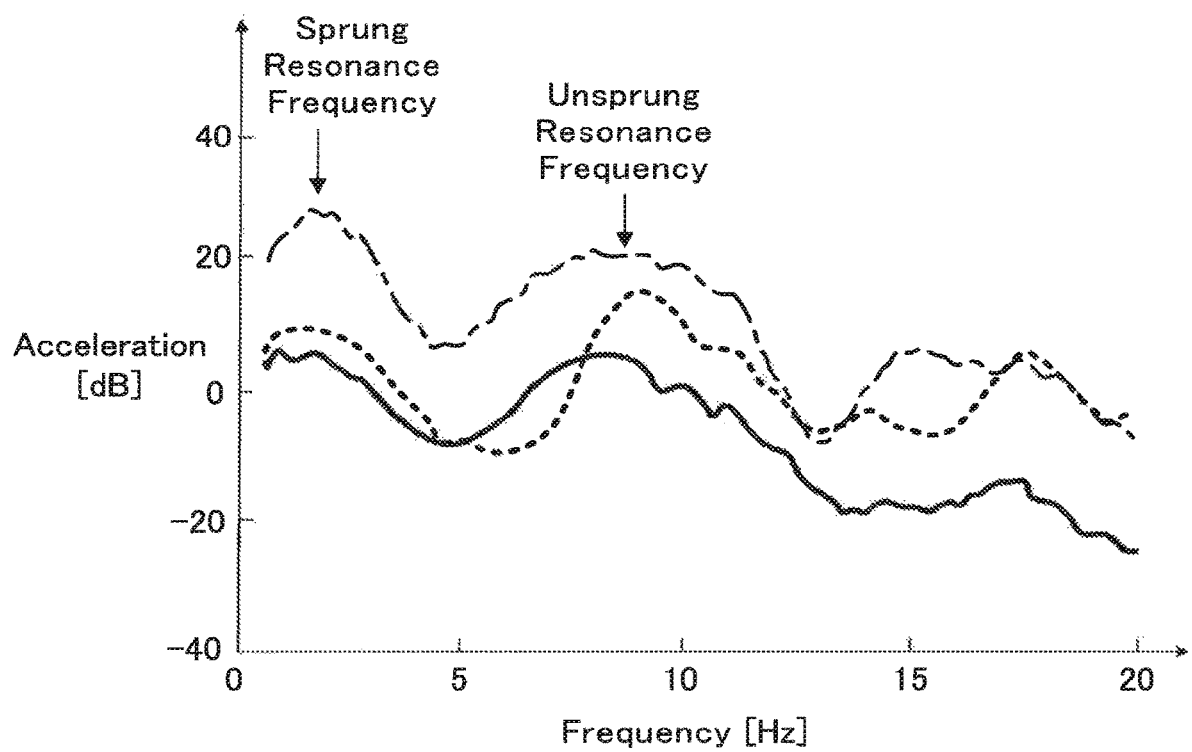
FIG. 8 is a Bode diagram showing a relationship between the sprung mass acceleration of a heave mode caused by a road surface input and a frequency with respect to the first embodiment (solid line), a known active suspension device (broken line), and a case where attitude control is not performed (one-dot chain line).

For example, FIG. 8 is a Bode diagram showing a relationship between a sprung acceleration of the heave mode caused by a road surface input and a frequency. In FIG. 8, the solid line indicates the first embodiment, the broken line shows the control related to the present disclosure (FIG. 7), and the alternate long and short dashed line shows a case where the attitude control is not performed. In particular, FIG. 8 shows the values when the mass of the sprung mass is 1400 kg, the mass of the unsprung mass is 80 kg, and the mass of the mass body is 10 kg.

From FIG. 8, it is seen that according to the first embodiment, sprung vibration in a frequency region higher than the unsprung resonance frequency can be reduced more effectively as compared to the control related to the present disclosure. In addition, according to the first embodiment, it is understood that the sprung vibration in the frequency range of the sprung resonance and the frequency region in the vicinity thereof can be reduced as compared to the control related to the present disclosure.

Although not shown in the drawings, the same effect as in FIG. 8 was found also in a vehicle in which the sprung mass and the like are different from the above values. Also, similar to the effect of the heave mode, shown in FIG. 8, it was recognized that the vibration damping effect was improved also in the roll mode and the pitch mode as compared to the control related to the present disclosure. As, in the control related to the present disclosure, it was confirmed that the damping can be satisfactorily achieved in the yaw mode and the longitudinal mode as compared to where the attitude control is not performed.

Furthermore, according to the first embodiment, as described above, the control fore vector {Fc} is calculated so that a square norm of the control force vector {Fc} represented by the equation (7) becomes minimum and the five target motion state quantities of the vector are achieved. Accordingly, energy required for the attitude control is minimized, which enables to control the attitude of the vehicle satisfactorily by controlling the motion state quantities of the vehicle to the target motion state quantities while reducing power consumption by the attitude control. With respect to the pitch mode and the yaw mode, damping is achieved in the same way as in the known active suspension devices.

Example of Another Combination of Control Devices

In the first embodiment, the in-wheel motors $28i$, the upper actuators $34i$, and the lower actuators $36i$ are provided corresponding to the respective wheels, but the number and arrangement of the control devices excluding the braking device 41 may be different from the first embodiment as shown in FIG. 9. In the various combinations shown in FIG. 9, as with the first embodiment, the attitude of the vehicle body can be controlled more effectively as compared to the known active suspension devices.

<No. 1 to No. 4>

In Nos. 1 to 4, the number of electric motors, which are driving power sources, is two. In No. 1, the left and right front wheels are driven by corresponding in-wheel motors. In No. 2, the left and right rear wheels are driven by corresponding in-wheel motors. In No. 3, the left and right front wheels are driven by corresponding electric motors (mounted on the vehicle body) via drive shafts. In No. 4, the left and right rear wheels are driven by corresponding electric motors (mounted on the vehicle body) via drive shafts.

Also, in No. 1 to No. 4, each active suspension device $30i$ of the front left wheel, the front right wheel, the rear left wheel and the rear right wheel includes a mass body $32i$, an upper actuator $34i$, and a lower actuator $36i$. Therefore, the number of attitude control devices is six, which is larger than the number of degrees of freedom of attitude control (=5).

Notably, the transformation matrix [A] in No. 1 and No. 3 is expressed by the following equation (11).

$$\begin{bmatrix} a_f\cos\delta & a_f\cos\delta & -1 & -1 & -1 & -1 & 0 & 0 & 0 & 0 \\ d_f a_f\cos\delta & -d_f a_f\cos\delta & d_f & -d_f & d_r & -d_r & 0 & 0 & 0 & 0 \\ -l_f a_f\cos\delta & -l_f a_f\cos\delta & -l_f & -l_f & l_r & l_r & 0 & 0 & 0 & 0 \\ -d_f\cos\delta + l_f\sin\delta & d_f\cos\delta + l_f\sin\delta & 0 & 0 & 0 & 0 & 0 & 0 & 0 & 0 \\ 1 & 1 & 0 & 0 & 0 & 0 & 0 & 0 & 0 & 0 \\ -a_f\cos\delta & 0 & 0 & 0 & 0 & 0 & -1 & 0 & 0 & 0 \\ 0 & -a_f\cos\delta & 0 & 0 & 0 & 0 & 0 & -1 & 0 & 0 \\ 0 & 0 & 0 & 0 & 0 & 0 & 0 & 0 & -1 & 0 \\ 0 & 0 & 0 & 0 & 0 & 0 & 0 & 0 & 0 & -1 \end{bmatrix} \quad (11)$$

The transformation matrix [A] in No. 2 and No. 4 is expressed by the following equation (12).

$$\begin{bmatrix} a_r & a_r & -1 & -1 & -1 & -1 & 0 & 0 & 0 & 0 \\ d_r a_r & -d_r a_r & d_f & -d_f & d_r & -d_r & 0 & 0 & 0 & 0 \\ l_r a_r & l_r a_r & -l_f & -l_f & l_r & l_r & 0 & 0 & 0 & 0 \\ -d_r & d_r & 0 & 0 & 0 & 0 & 0 & 0 & 0 & 0 \\ 1 & 1 & 0 & 0 & 0 & 0 & 0 & 0 & 0 & 0 \\ 0 & 0 & 0 & 0 & 0 & 0 & -1 & 0 & 0 & 0 \\ 0 & 0 & 0 & 0 & 0 & 0 & 0 & -1 & 0 & 0 \\ -a_r & 0 & 0 & 0 & 0 & 0 & 0 & 0 & -1 & 0 \\ 0 & -a_r & 0 & 0 & 0 & 0 & 0 & 0 & 0 & -1 \end{bmatrix} \quad (12)$$

<No. 5 to No. 8>

In Nos. 5 to 8, the number of electric motors, which are driving power sources, is three. In No. 5, the left and right front wheels are driven by corresponding in-wheel motors, and the left and right rear wheels are driven by one electric motor (mounted on the vehicle body) via corresponding drive shafts. In No. 6, the left and right rear wheels are driven by corresponding in-wheel motors, and the left and right front wheels are driven by one electric motor (mounted on the vehicle body) via corresponding drive shafts. In No. 7, the left and right front wheels are driven by corresponding electric motors (mounted on the vehicle body) via drive shafts, and the left and right rear wheels are driven by one electric motor (mounted on the vehicle body) via corresponding drive shafts. In No. 8, the left and right rear wheels are driven by corresponding electric motors (mounted on the vehicle body) via drive shafts, and the left and right front wheels are driven by one electric motor (mounted on the vehicle body) via corresponding drive shafts.

Also, in No. 5 to No. 8, each active suspension devices 30$i$ of the front left wheel, the front right wheel, the rear left wheel and the rear right wheel include a mass body 32$i$, an upper actuator 34$i$, and a lower actuator 36$i$. Therefore, the number of attitude control devices is seven, which is larger than the number of degrees of freedom of attitude control (=5).

Notably, the transformation matrix [A] in No. 5 and No. 7 is expressed by the following equation (13).

$$\begin{bmatrix} a_f\cos\delta & a_f\cos\delta & 2a_r & -1 & -1 & -1 & -1 & 0 & 0 & 0 & 0 \\ d_f a_f\cos\delta & -d_f a_f\cos\delta & 0 & d_f & -d_f & d_r & -d_r & 0 & 0 & 0 & 0 \\ -l_f a_f\cos\delta & -l_f a_f\cos\delta & 2l_r a_r & -l_f & -l_f & l_r & l_r & 0 & 0 & 0 & 0 \\ -d_f\cos\delta + l_f\sin\delta & d_f\cos\delta + l_f\sin\delta & 0 & 0 & 0 & 0 & 0 & 0 & 0 & 0 & 0 \\ 1 & 1 & 2 & 0 & 0 & 0 & 0 & 0 & 0 & 0 & 0 \\ -a_f\cos\delta & 0 & 0 & 0 & 0 & 0 & 0 & -1 & 0 & 0 & 0 \\ 0 & -a_f\cos\delta & 0 & 0 & 0 & 0 & 0 & 0 & -1 & 0 & 0 \\ 0 & 0 & -a_r & 0 & 0 & 0 & 0 & 0 & 0 & -1 & 0 \\ 0 & 0 & -a_r & 0 & 0 & 0 & 0 & 0 & 0 & 0 & -1 \end{bmatrix} \quad (13)$$

The transformation matrix [A] in No. 6 and No. 8 is expressed by the following equation (14).

$$\begin{bmatrix} 2a_f\cos\delta & a_r & a_r & -1 & -1 & -1 & -1 & 0 & 0 & 0 & 0 \\ 0 & d_r a_r & -d_r a_r & d_f & -d_f & d_r & -d_r & 0 & 0 & 0 & 0 \\ -2l_f a_f\cos\delta & l_r a_r & l_r a_r & -l_f & -l_f & l_r & l_r & 0 & 0 & 0 & 0 \\ 2l_f\sin\delta & -d_r & d_r & 0 & 0 & 0 & 0 & 0 & 0 & 0 & 0 \\ 2 & 1 & 1 & 0 & 0 & 0 & 0 & 0 & 0 & 0 & 0 \\ -a_f\cos\delta & 0 & 0 & 0 & 0 & 0 & 0 & -1 & 0 & 0 & 0 \\ -a_f\cos\delta & 0 & 0 & 0 & 0 & 0 & 0 & 0 & -1 & 0 & 0 \\ 0 & -a_r & 0 & 0 & 0 & 0 & 0 & 0 & 0 & -1 & 0 \\ 0 & 0 & -a_r & 0 & 0 & 0 & 0 & 0 & 0 & 0 & -1 \end{bmatrix} \quad (14)$$

<No. 9 to No. 11>

In Nos. 9 to 11. the number of electric motors as the driving power source is four. In No. 9, as in the first embodiment, the left and right front wheels and the left and right rear wheels are driven by corresponding in-wheel motors. In No. 10, the left and right front wheels are driven by corresponding in-wheel motors, and the left and right rear wheels are driven by corresponding electric motors (mounted on the vehicle body) via corresponding drive shafts. In No. 11, the left and right rear wheels are driven by corresponding in-wheel motors, and the left and right front wheels are driven by corresponding electric motors (mounted on the vehicle body) via corresponding drive shafts.

In No. 9 to No. 11, the suspensions of the left and right front wheels or the suspensions of the left and right rear wheels may be the same active suspension device $30i$ as in the first embodiment, or the suspensions of the four wheels may be the same as in the first embodiment. Therefore, the number of attitude control devices is six or eight, which is larger than the number of degrees of freedom of attitude control (=5).

When the suspensions of the left and right front wheels are the same active suspension devices 30FL and 30FR as in the first embodiment, the transformation matrix [A] in Nos. 9 to 11 is expressed by the following equation (15).

$$\begin{bmatrix} a_f\cos\delta & a_f\cos\delta & a_r & a_r & -1 & -1 & 0 & 0 \\ d_f a_f\cos\delta & -d_f a_f\cos\delta & d_r a_r & -d_r a_r & d_f & -d_f & 0 & 0 \\ -l_f a_f\cos\delta & -l_f a_f\cos\delta & l_r a_r & l_r a_r & -l_f & -l_f & 0 & 0 \\ -d_f\cos\delta + l_f\sin\delta & d_f\cos\delta + l_f\sin\delta & -d_r & d_r & 0 & 0 & 0 & 0 \\ 1 & 1 & 1 & 1 & 0 & 0 & 0 & 0 \\ -a_f\cos\delta & 0 & 0 & 0 & 0 & 0 & -1 & 0 \\ 0 & -a_f\cos\delta & 0 & 0 & 0 & 0 & 0 & -1 \end{bmatrix} \quad (15)$$

Further, when the suspensions of the suspensions of the left and right rear wheels are the same active suspension devices 30RL and 30RR as in the first embodiment, the transformation matrix [A] in No. 9 to No. 11 is expressed by the following equation (16).

$$\begin{bmatrix} a_f\cos\delta & a_f\cos\delta & a_r & a_r & -1 & -1 & 0 & 0 \\ d_f a_f\cos\delta & -d_f a_f\cos\delta & d_r a_r & -d_r a_r & d_f & -d_f & 0 & 0 \\ -l_f a_f\cos\delta & -l_f a_f\cos\delta & l_r a_r & l_r a_r & l_f & l_f & 0 & 0 \\ -d_f\cos\delta + l_f\sin\delta & d_f\cos\delta + l_f\sin\delta & -d_r & d_r & 0 & 0 & 0 & 0 \\ 1 & 1 & 1 & 1 & 0 & 0 & 0 & 0 \\ 0 & 0 & -a_r & 0 & 0 & 0 & -1 & 0 \\ 0 & 0 & 0 & -a_r & 0 & 0 & 0 & -1 \end{bmatrix} \quad (16)$$

Furthermore, when the suspension of the four wheels is the same active suspension device $30i$ as in the first embodiment, the transformation matrix [A] in No. 9 to No. 11 is expressed by the following equation (17).

$$\begin{bmatrix} a_f\cos\delta & a_f\cos\delta & a_r & a_r & -1 & -1 & -1 & -1 & 0 & 0 & 0 & 0 \\ d_f a_f\cos\delta & -d_f a_f\cos\delta & d_r a_r & -d_r a_r & d_f & -d_f & -d_r & -d_r & 0 & 0 & 0 & 0 \\ -l_f a_f\cos\delta & -l_f a_f\cos\delta & l_r a_r & l_r a_r & -l_f & -l_f & l_r & l_r & 0 & 0 & 0 & 0 \\ -d_f\cos\delta + l_f\sin\delta & d_f\cos\delta + l_f\sin\delta & -d_r & -d_r & 0 & 0 & 0 & 0 & 0 & 0 & 0 & 0 \\ 1 & 1 & 1 & 1 & 0 & 0 & 0 & 0 & 0 & 0 & 0 & 0 \\ -a_f\cos\delta & 0 & 0 & 0 & 0 & 0 & 0 & 0 & -1 & 0 & 0 & 0 \\ 0 & -a_f\cos\delta & 0 & 0 & 0 & 0 & 0 & 0 & 0 & -1 & 0 & 0 \\ 0 & 0 & -u_r & 0 & 0 & 0 & 0 & 0 & 0 & 0 & -1 & 0 \\ 0 & 0 & 0 & -a_r & 0 & 0 & 0 & 0 & 0 & 0 & 0 & -1 \end{bmatrix} \quad (17)$$

In Nos. 3 to 8, No. 10 and No. 11, there are wheels driven by the electric motors mounted on the vehicle body via the drive shafts. The angles θf and/or θr of these wheels are different from the angles (FIG. 5) in the first embodiment. That is, the angle θf is an angle formed by a straight line connecting the instantaneous rotation center Of of the front wheel and the rotational axis (not shown) of the front wheel with respect to the horizontal direction. The angle θr is an angle formed by a straight line connecting the instantaneous rotation center Or of the rear wheel and the rotational axis (not shown) of the rear wheel with respect to the horizontal direction.

Second to Fifth Embodiments

FIGS. 10 to 13 show the active suspension devices 86i according to the second to fifth embodiments of the attitude control apparatus of the present disclosure. Each active suspension device 86i has a mass body 88i, an upper actuator 90i and a lower actuator 92i. It is to be noted that in FIGS. 10 to 13, a spring system and a damping system (corresponding to the spring system 42 and the damping system 44 shown in FIG. 2, respectively) supporting the mass body 88i are not shown. The attitude control in the second to fifth embodiments is the same as in the first embodiment except that the upper actuators 90i and the lower actuators 92 i are controlled in place of the upper actuators 34i and the lower actuators 36i, respectively.

Figure 10:
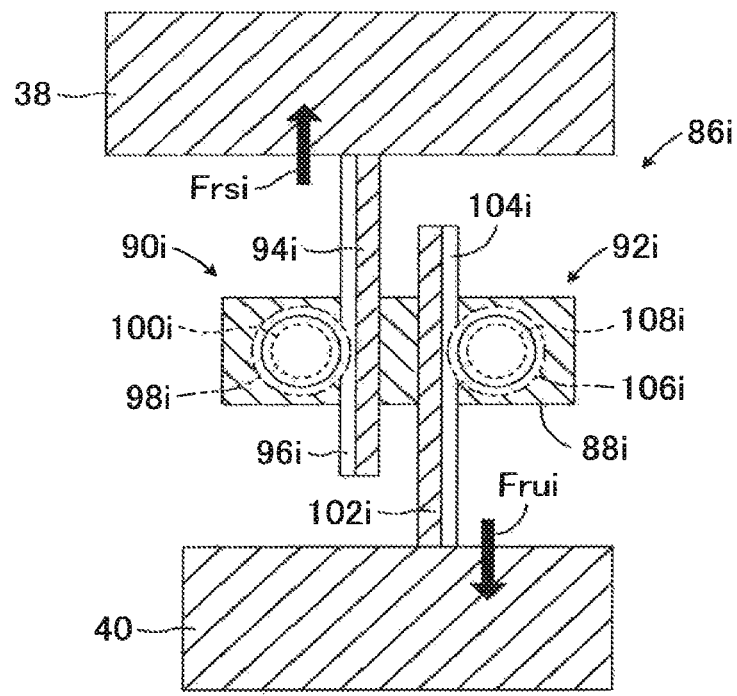
FIG. 10 is a view showing an active suspension device according to a second embodiment of the vehicle attitude control apparatus of the present disclosure.

In the second embodiment shown in FIG. 10, each upper actuator 90i has an upper rack bar 94i supported by a sprung mass 38 at the upper end and an upper pinion 98i meshing with rack teeth 96i of the upper rack bar. Each upper rack bar 94i extends vertically through the mass body 88i, and the mass body is vertically displaceable with respect to the upper rack bar. Each pinion 98i is driven to rotate via a reduction gear not shown in the figure by an electric motor 100i supported by the mass body 88i.

The rack teeth 96i and the pinion 98i constitute a rack and pinion mechanism. A driving torque of each electric motor 100i is converted into vertical force by the rack and pinion mechanism. An urging force is applied to the mass body 88i, and an actively generated force Frsi, which is a reaction force thereof, is transmitted to the sprung mass 38 by the upper rack bar 94i.

Similarly, each lower actuator 92i has a lower rack bar 102i supported by the unsprung mass 40 at the lower end and a pinion 106i meshing with rack teeth 104i of the lower rack bar. Each lower rack bar 102i extends vertically through the mass body 88i, and the mass body is vertically displaceable with respect to the lower rack bar. Each pinion 106i is driven to rotate via a reduction gear not shown in the figure by an electric motor 108i supported by the mass body 88i.

The rack teeth 104i and the pinions 106i constitute a rack, and pinion mechanism. A driving torque of each electric motor 108i is converted into vertical force by the rack and pinion mechanism. An urging force is applied to the mass body 88i, and an actively generated force Frui, which is a reaction force thereof, is transmitted to the unsprung mass 40 by the lower rack bar 102i.

Note that the upper rack bar 94i and the lower rack bar 102i may be connected to the sprung mass 38 and the unsprung mass 40 via ball joints or the like, respectively. Further, the mass body 88i is composed of an upper mass body supporting the electric motor 100i and a lower mass body supporting the electric motor 108i, and the upper mass body and the lower mass body may be connected by a connecting member such as a connecting member 50i so that the rack bars 94i and 102i can be inclined relative to each other.

Figure 11:
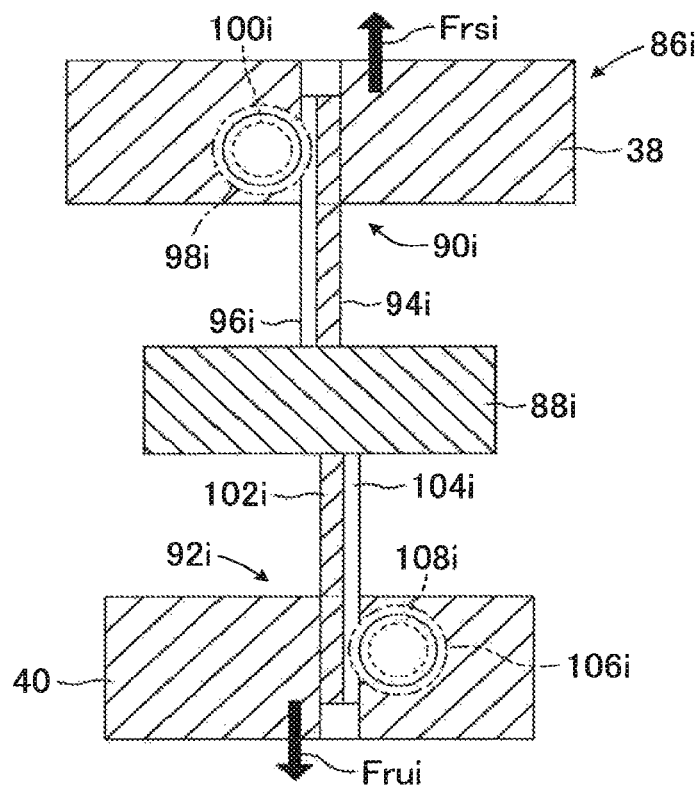
FIG. 11 is a view showing an active suspension device according to a third embodiment of the vehicle attitude control apparatus of the present disclosure.

In the third embodiment shown in FIG. 11, an upper rack bar 94i of the upper actuator 90i is connected to the mass body 88i at the lower end, and is supported by the sprung mass 38 so as to be displaceable in the vertical direction with respect to the sprung mass. A lower rack bar 102i of the lower actuator 92i is connected to the mass body 88i at the upper end and is supported by the unsprung mass 40 so as to be displaceable in the vertical direction with respect to the unsprung mass.

An upper pinion 98i meshing with rack teeth 96i of the upper rack bar is driven to rotate via a reduction gear not shown in the figure by an electric motor 100i supported by the sprung mass 38. A lower pinion 106i meshing with rack teeth 104i of the lower rack bar is driven to rotate via a reduction gear not shown in the figure by an electric motor 108i supported by the unsprung mass 40.

Also in the third embodiment, the rack teeth 96i and the pinions 98i constitute a rack-and-pinion mechanism, and the rack teeth 104i and the pinions 106i constitute a rack and pinion mechanism. A driving torque of the electric motor 100i is converted into a vertical force by the rack and pinion mechanism. An urging force is applied to the mass body 88i via the upper rack bar 94i, and an actively generated force Frsi that is a reaction force thereof is applied to the sprung mass 38. A driving torque of the electric motor 108i is converted into a vertical force by the rack and pinion mechanism. An urging force is applied to the mass body 88i via the lower rack bar 102i, and an actively generated force Frui that is a reaction force thereof is applied to the unsprung mass 40.

Although the upper rack bar 94i and the lower rack bar 102i are aligned with each other and extend in the vertical direction, they may not be aligned with each other. Also, at least one of the upper rack bar 94i and the lower rack bar 102i may be connected to the corresponding sprung mass 38 or the unsprung mass 40 via a ball joint or the like.

Figure 12:
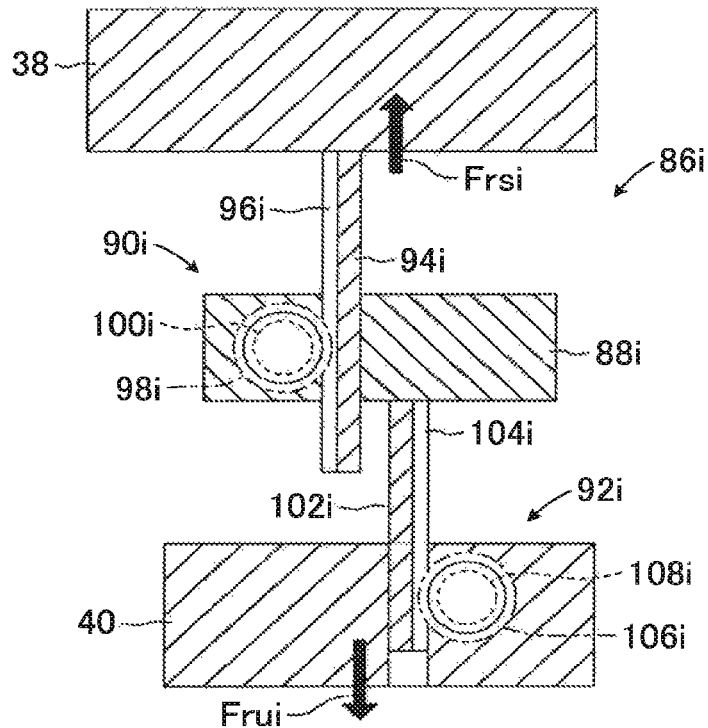
FIG. 12 is a view showing an active suspension device according to a fourth embodiment of the vehicle attitude control apparatus of the present disclosure.

In the fourth embodiment shown in FIG. 12, the upper actuator 90i is structured in the same manner as in the second embodiment, and the lower actuator 92i is structured in the same manner as in the third embodiment. Therefore, the pinion 98i meshing with the rack teeth 96i of the upper rack bar is rotationally driven by the electric motor 100i supported by the mass body 88i via a reduction gear (not shown). The pinion 106i meshing with the rack teeth 104i of the lower rack bar is driven to rotate by the electric motor 108i supported by the unsprung mass 40 via a reduction gear (not shown).

Figure 13:
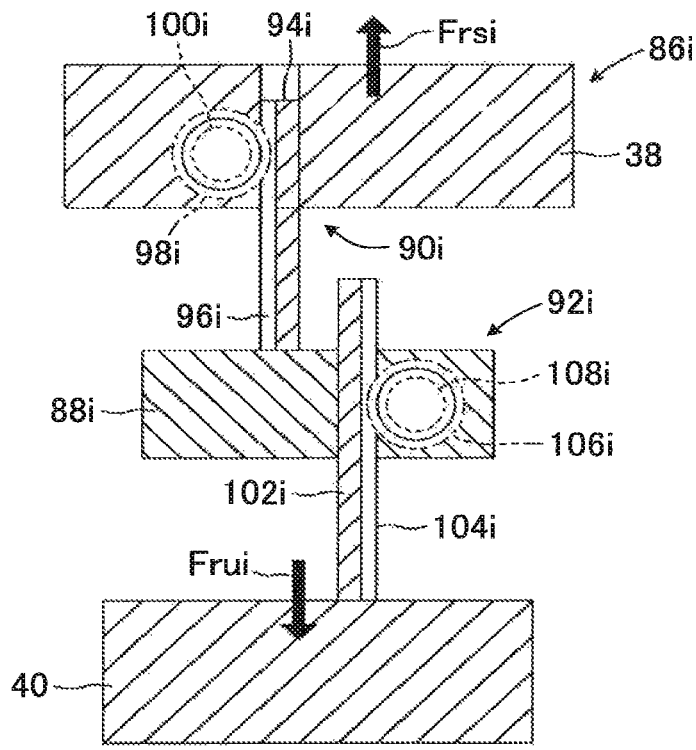
FIG. 13 is a view showing an active suspension device according to a fifth embodiment of the vehicle attitude control apparatus of the present disclosure.

In the fifth embodiment shown in FIG. 13, the upper actuator 90i is structured in the same manner as in the third embodiment, and the lower actuator 92i is structured in the same manner as in the second embodiment. Therefore, the pinion 98i meshing with the rack teeth 96i of the upper rack bar is rotationally driven by the electric motor 100i supported by the sprung mass 38 via a reduction gear (not shown). The pinion 106i meshing with the rack teeth 104i of the lower rack bar is driven to rotate by the electric motor 108i supported by the mass body 88i via a reduction gear (not shown).

The active suspension devices 86i according to the second to fifth embodiments function in the same manner as the active suspension device 30i of the first embodiment. That is, as in the first embodiment, the upper actuator 90i applies the actively generated force Fsi to the sprung mass 38, and the lower actuator 92i applies the actively generated force Fui to the unsprung mass 40. Therefore, the attitude control in the second to fifth embodiments may be executed in the same manner as in the first embodiment and the other combinations of the control devices No. 1 to No. 11 described above.

[Modification]

The first to fifth embodiments described above are also applicable when the actively generated forces Fsi of the upper actuators 34*i* or 90*i* of the suspensions 18*i* or the actively generated forces Fui of the lower actuators 34*ui* or 92*i* are restricted. A restriction rate of actively generated forces Fsi and Fui of the front suspensions 18FL and 18FR is represented by Wf (0<Wf<1), and a restriction rate of the actively generated forces Fsi and Fui of the rear suspensions 18RL and 18RR is represented by Wr (0<Wr<1).

In this situation, a calculation equation of the control force vector {Fc} corresponding to the above equation (6) is expressed by the following equation (18).

$$\begin{Bmatrix} FdFL \\ FdFR \\ FdRL \\ FdRR \\ FsFL \\ FsFR \\ FsRL \\ FsRR \\ FuFL \\ FuFR \\ FuRL \\ FuRR \end{Bmatrix} = [Aw]^T ([A][Aw]^T)^{-1} \begin{Bmatrix} Fz \\ Mx \\ My \\ Mz \\ Fx \end{Bmatrix} \quad (18)$$

In the above equation (18), $[Aw]^T$ and $[W]$ are represented by the following equations (19) and (20), respectively.

$$[Aw]^T = [W]^{-1}[A]^T \quad (19)$$

$$[W] = \begin{bmatrix} 1 & & & & & & & & & & & \\ & 1 & & & & & & & 0 & & & \\ & & 1 & & & & & & & & & \\ & & & 1 & & & & & & & & \\ & & & & Wfs & & & & & & & \\ & & & & & Wfs & & & & & & \\ & & & & & & Wrs & & & & & \\ & & & & & & & Wrs & & & & \\ & & & & & & & & Wfu & & & \\ & 0 & & & & & & & & Wfu & & \\ & & & & & & & & & & Wru & \\ & & & & & & & & & & & Wru \end{bmatrix} \quad (20)$$

According to this modification, since the control force vector {Fc} is calculated according to the above equations (18) to (20), even when the actively generated forces Fsi and Fui are limited, substantially the same effects as those of the first to fifth embodiments can be obtained.

Although the present disclosure has been described in detail with reference to specific embodiments, it will be apparent to those skilled in the art that the present disclosure is not limited to the above-described embodiments, and various other embodiments are possible within the scope of the present disclosure.

For example, in the above-described first to fifth embodiments and other combinations of control devices, based on driving operation amounts of a driver detected by the operation amount detection sensor 72 and running state quantities of the vehicle 14 detected by the state quantity detection sensor 74, a target value vector including a target vertical force Fz and the like is calculated. However, sprung and unsprung mass velocities may be calculated and at least a portion of the target value vector may be calculated based on the sprung and unsprung mass velocities. In that case, sprung and unsprung mass accelerations may be detected and sprung and unsprung mass velocities may be estimated respectively by a Fourier series prediction filter or a filter based thereon based on the sprung and unsprung mass accelerations, respectively.

In the above-described first embodiment, each mass body 32*i* is supported by the unsprung mass 40 via the spring system 42 and the damping system 44 fixed to the unsprung mass. However, each mass body 32*i* may be supported by the sprung mass 38 via a spring system and a damping system fixed to the sprung mass, or may be supported by the sprung mass via spring systems and damping systems fixed to the unsprung mass 40 and the sprung mass 38. This also applies to the second to fifth embodiments shown in FIGS. 10 to 13.

In addition, in the above-described first embodiment, a plurality of electromagnetic coils 54*i* and 58*i* are fixed to the upper support plates 48*i* and the lower support plates 50*i*, respectively, and a plurality of permanent magnets 56*i* and 60*i* are fixed to the mass bodies 32*si*. However, a plurality of permanent magnets 56*i* may be fixed to the upper support plates 48*i* and a plurality of electromagnetic coils 54*i* may be fixed to the mass bodies 32*si*. Likewise, a plurality of permanent magnets 60*i* may be fixed to the lower support plates 50*i* and a plurality of electromagnetic coils 58*i* may be fixed to the mass bodies 32*si*.

Further, in the above-described first to fifth embodiments and other combinations of control devices, a target value vector includes a target vertical force Fz, a target roll moment Mx, a target pitch moment My, a target yaw moment Mz, and a target longitudinal force Fx. However, any one of the target vertical force Fz, the target roll moment Mx, the target pitch moment My and the target yaw moment Mz may be omitted.

Further, in the above-described embodiments, the attitude control apparatus is applied to a vehicle having front wheels which are steered wheels and rear wheels which are non-steered wheels. However, the attitude control apparatus of the present disclosure may be applied to a vehicle having front wheels which are non-steered wheels and rear wheels which are steered wheels or a vehicle having front wheels and rear wheels which are steered wheels.

What is claimed is:

1. A vehicle attitude control apparatus comprising braking/driving devices for imparting braking/driving forces to respective wheels, active suspension devices each incorporated in a suspension of a corresponding wheel to change a vertical force acting between a sprung mass and an unsprung mass of a vehicle, and a control unit for controlling the braking/driving device and the active suspension device, wherein each active suspension device includes a mass body disposed between the sprung mass and the unsprung mass of the vehicle, an upper actuator configured to apply an urging force to the mass body and transmit an upper actively generated force, which is a reaction force thereof, to the sprung mass, and a lower actuator configured to apply an urging force to the mass body and transmit a lower actively generated force, which is a reaction force thereof, to the unsprung mass, the control unit is configured to calculate target motion state quantities for stabilizing attitude of the vehicle based on a running state of the vehicle, calculate target braking/driving forces of the braking/driving devices, target upper actively generated forces, and target lower actively generated forces for setting motion state quantities of the vehicle to the target motion state quantities, and control the braking/driving devices, the upper actuators and the lower actuators so that the target braking/driving forces, the target upper actively generated forces, and the target lower actively generated forces are achieved, and a total number of the braking/driving devices, the upper actuators and the lower actuators is larger than a number of the target motion state quantities, and the control unit is configured to calculate the target braking/driving forces, the target upper actively generated forces, and the target lower actively generated forces so that a square norm of the target braking/driving forces, the target upper actively generated forces and the target lower actively generated forces becomes minimum and motion state quantities of the vehicle becomes the target motion state quantities.

2. The vehicle attitude control apparatus according to claim 1, wherein each upper actuator cooperates with the mass body to constitute an upper linear motor, and each lower actuator cooperates with the mass body to constitute a lower linear motor.

3. The vehicle attitude control apparatus according to claim 1, wherein each upper actuator includes an upper rack bar and an upper pinion; one of the upper rack bar and the upper pinion is supported by the sprung mass and the other of the upper rack bar and the upper pinion is supported by the mass body; each lower actuator includes a lower rack bar and a lower pinion; and one of the lower rack bar and the lower pinion is supported by the unsprung mass and the other of the lower rack bar and the lower pinion is supported by the mass body.

4. The vehicle attitude control apparatus according to claim 1, wherein each mass body is supported by at least one of the sprung mass and the unsprung mass via a spring system and a damping system.

\* \* \* \* \*